No. 709,601. Patented Sept. 23, 1902.
A. HORNER.
CULTIVATING PLOW.
(Application filed June 26, 1902.)
(No Model.)

Witnesses,
F. Dudley Moss

Inventor,
Albert Horner
By Dewey Strong & Co.
atty

UNITED STATES PATENT OFFICE.

ALBERT HORNER, OF PAAUILO, HAWAII TERRITORY.

CULTIVATING-PLOW.

SPECIFICATION forming part of Letters Patent No. 709,601, dated September 23, 1902.

Application filed June 26, 1902. Serial No. 113,255. (No model.)

*To all whom it may concern:*

Be it known that I, ALBERT HORNER, a citizen of the United States, residing at Paauilo, Island of Hawaii, Territory of Hawaii, have invented an Improvement in Cultivating-Plows; and I hereby declare the following to be a full, clear, and exact description of the same.

My invention relates to an apparatus which is especially designed for working the ground between rows of sugar-cane or any equivalent vegetable product which is grown in a similar manner.

It consists of a pair of angularly-mounted revoluble disks adjustable forward and back and with relation to the team and inclining toward each other at the top, a double or shovel plow adjustably located in front of the disks, and a subsoil-plow located in the rear of the disks, these parts being all adjustable in relation to each other, so that the ground can be thoroughly cultivated, weeds destroyed, and the earth hilled up against the rows to any desired degree.

It also comprises details of construction, which will be more fully explained by reference to the accompanying drawings, in which—

Figure 1:
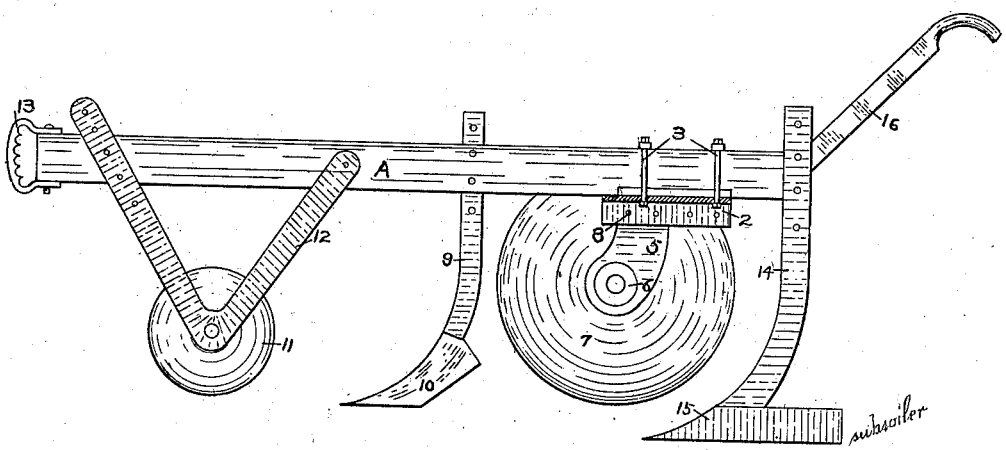
Figure 2:
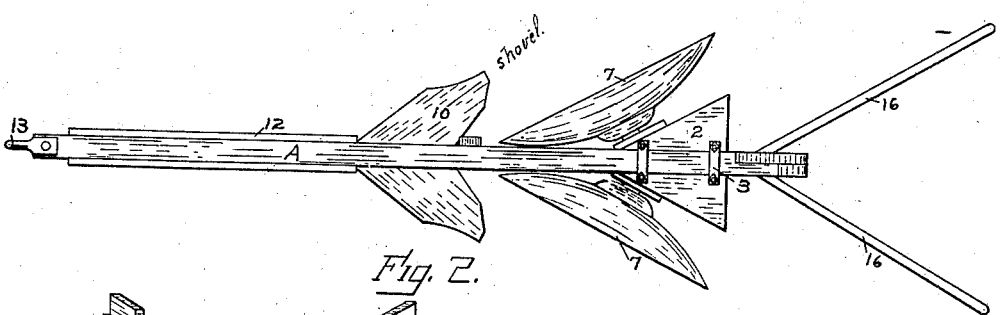
Figure 3:
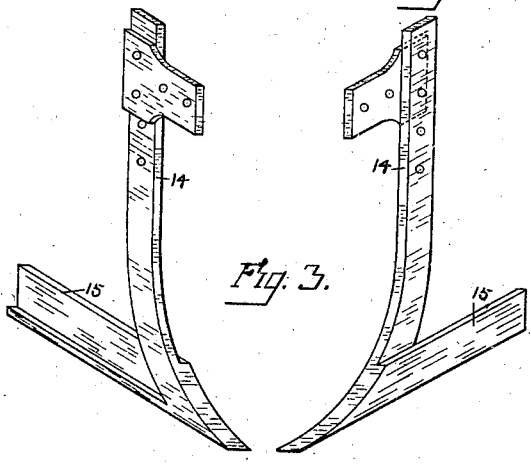
Figure 4:
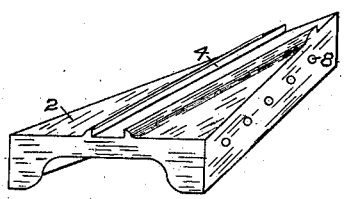

Figure 1 is a side elevation. Fig. 2 is a top view. Fig. 3 is a perspective of the subsoil-plow. Fig. 4 represents the triangular castings for holding and adjusting the disks.

The beam A is made of any suitable size or material and has attached to it a triangular casting 2, which serves as a support for the disks, as will be hereinafter described. This casting is clamped upon the beam by clamps, as shown at 3. These clamps may be of any suitable description. I have here shown them as passing through holes in the top of the hollow triangular part 2 and secured by nuts above the beam for convenience of access. The device may thus be adjustably secured to the beam at any desired point. This triangular part 2 is preferably formed with longitudinal elevated portions on the top, which forms a seat for the beam, as at 4, so that the latter will be very steadily held in place when the clamps are applied, and the parts prevent it from twisting.

To the sides of the triangular box 2 are attached the plates, or "drop-irons" 5, so called, which extend downwardly upon each side and have enlarged hubs or bosses 6 sufficient to support the shafts of the disks 7. These irons are secured to the sides of the triangle by bolts passing through holes, as shown at 8. These holes extending lengthwise of the converging sides of the triangle allow the disks to be brought close together at the front or separated by moving them backwardly upon the triangle, as may be desired.

The angle of the supporting-shafts is such that the disks converge toward the top, diverging at the bottom to any desired degree.

I prefer to employ disks about twenty-four inches in diameter, and the angle will be such that they will stand from three and one-half to five and one-half inches nearer together at the top than at the bottom. This gives a good angle, so that the disks will throw the dirt up against the rows between which they travel. The front edges of the disks should run very closely together, and from this they may be separated, as previously described, the object being in any case to thoroughly plow the land between the rows. In front of these disks is the standard 9 of a shovel-plow 10. This standard may be adjusted vertically with relation to the beam A, so that the plow 10 will run as deep as may be desired. This shovel-plow takes all the central portion of the land between that which will be cut by the disks and which, owing to their shape, they would not take. It is set as close to the disks as can be and turns the soil both ways in such a manner that it is at once taken up by the disks and laid near to the rows of cane. If the plow is working in heavy grass or in a field where there is trash, as soon as any grass or trash accumulates on the standard of the shovel-plow the ends will reach back far enough either one side or the other so that the soil which is being turned by the disks will fall on top of it and pull it back and cover it. The beam is purposely set high to leave plenty of space underneath for the clearing of trash and the like. Forward of the shovel-plow is the front wheel 11, which is supported upon standards or straps, as at 12, the upper ends of these standards being carried upon the beam A. The standard may be adjusted vertically with relation to the plow-beam in any suitable or well-known manner, depending on the character of the standard and its connection with the beam. I have here shown one form which would be satisfactory.

The clevis is shown at 13 and may be of any suitable pattern, such as the regular drop-plow clevis.

The apparatus is hauled by three animals, and they are separated so that each can travel in a row, the evener being sufficiently long for that purpose, and the singletrees would be of the ordinary length. The beam being set high, as previously stated, will plow large cane without breaking it.

Behind the disk 7 is fixed the standard 14 of the subsoil-plow, which is shown at 15. As here shown, the top of the standard is adjustably secured to the rear of the plow-beam and also serves as a support for the handles 16.

The plow 15 may be set to run either on a level or one, two, three, or four inches below the bottoms of the disks, and the holes in the top of the standard may be arranged so that the handles may be adjusted to conform to the depth that the plow may be working.

The plow 15 running behind the plow 10 and the disks loosens and mellows the soil to a considerable depth, making a perfect mulch, which retains the moisture, and the soil which is turned up against the cane rows is placed in a very nice even manner, lumps being all broken and the soil covering the small weeds in and between the canes.

Having thus described my invention, what I claim, and desire to secure by Letters Patent, is—

1. The combination in a cultivator of a pair of angularly-journaled disks upon each side the beam, the shovel-plow traveling centrally from front of said disks and a subsoiling-plow fixed to travel centrally behind the disks.

2. The combination in a cultivator of disks, plates or standards from the lower ends of which they are journaled and turnable, a triangular casting to which the upper ends of the standards are secured, a plow-beam and means for securing the casting to the beam, a shovel-plow having its standard connected with the beam and located in front of the disks and a subsoil-plow located in the rear of the disks.

3. A land-cultivating apparatus consisting of a beam, a triangular casting secured to the beam having perforations in its convergent sides, plates or standards adjustably bolted to said sides of the casting extending downwardly and forming supports for journal-shafts, disk plows mounted thereon converging from the rear toward the front, a shovel-plow having its standard adjustably connected with the plow-beam and located in front of the disks, guiding-handles carried thereby and a supporting-wheel adjustably connected with the front of the plow-beam.

4. A land-cultivating apparatus consisting of a plow-beam having a bearing-wheel adjustably connected with the front and hauling clevises, a double or shovel plow having a standard adjustably connected with the plow-beam, a triangular casting adjustably secured to the plow-beam convergent from the rear toward the front, plates or standards adjustably secured to said convergent sides and movable so as to bring them nearer to or farther from each other, disks journaled and turnable from the lower ends of said standards and correspondingly movable to or from each other, a subsoiling-plow having a standard adjustably connected with the rear of the beam and handles carried therewith.

5. A land-cultivating apparatus comprising a beam with centrally-located adjustable plows near the front and rear ends, a pair of intermediate divergently-mounted revoluble disks, a support for the hangers of said disks, consisting of a triangular casting adjustably secured to the beam and convergent toward the front, and attachments by which the hangers may be moved forward or backward along the convergent sides to move the disks to or from each other.

In witness whereof I have hereunto set my hand.

ALBERT HORNER.

Witnesses:
L. B. MAYNARD,
H. W. SHEPHERD.